United States Patent [19]

Banâtre et al.

[11] Patent Number: 4,734,855
[45] Date of Patent: Mar. 29, 1988

[54] APPARATUS AND METHOD FOR FAST AND STABLE DATA STORAGE

[75] Inventors: Michel P. P. A. Banâtre; Jean-Pierre A. F. J. Banâtre, both of La Fresnais; Florimond E. A. Ployette, Rennes; Bertrand J. G. Decouty, Acigne; Yves H. Prunault, Corps-Nuds, all of France

[73] Assignee: INRIA-Institut National de Recherche en Informatique et en Automatique, Le Chesnay, France

[21] Appl. No.: 749,622
[22] PCT Filed: Oct. 16, 1984
[86] PCT No.: PCT/FR84/00231
  § 371 Date: Jun. 13, 1985
  § 102(e) Date: Jun. 13, 1985
[87] PCT Pub. No.: WO85/01815
  PCT Pub. Date: Apr. 25, 1985

[30] Foreign Application Priority Data

Oct. 17, 1983 [FR] France .................. 83 16488

[51] Int. Cl.⁴ ............................. G06F 12/00
[52] U.S. Cl. .......................... 364/200; 365/189
[58] Field of Search ... 364/200 MS File, 900 MS File; 365/189

[56] References Cited

U.S. PATENT DOCUMENTS 3,480,916 11/1969 Belt et al. ............... 364/200
3,825,903 7/1974 Brown .................... 364/200
4,120,030 10/1978 Johnstone ................ 364/200
4,293,910 10/1981 Flusche et al. ........... 364/200
4,342,079 7/1982 Stewart et al. ........... 364/200
4,598,362 7/1986 Kinjo et al. ............. 364/200
4,601,018 7/1986 Baum et al. .............. 365/189

FOREIGN PATENT DOCUMENTS 0067227 12/1982 European Pat. Off. .
1436170 4/1965 France .

OTHER PUBLICATIONS

Chamoff and Thorson, IBM Technical Disclosure Bulletin, "Nonvolatile Totals Implementation", vol. 20, No. 10, pp. 4071-4072, Mar. 1978.
Kuck, The Structure of Computers and Computations, vol. 1, John Wiley & Sons, Inc., 1978, pp. 392-399.
Schroeder, Communications of the ACM, "A Hardware Architecture for Implementing Protection Rings", vol. 15, No. 3, pp. 157-170, Mar. 1972.

Primary Examiner—Raulfe B. Zache
Attorney, Agent, or Firm—Schwartz, Jeffery, Schwaab, Mack, Blumenthal & Evans

[57] ABSTRACT

An apparatus and method for fast and stable information storage is provided that employs a data storage apparatus having a series of non-volatile memory banks that are externally addressable and have selective write and read controls. Access to the memory banks is provided via hardware access protection mechanisms to ensure that any access to the memory banks is verified by means of an access key. Software access protection is also provided if two separate processors share a common memory bank.

17 Claims, 7 Drawing Figures

APPARATUS AND METHOD FOR FAST AND STABLE DATA STORAGE

BACKGROUND OF THE INVENTION

The present invention relates to processing data or information, and more particularly to storage thereof, when said storage has to be performed with a high degree of security.

In numerous applications, and in particular those related to distributed computing, it is desirable to have stable memories available.

A stable memory is a data storage device which possesses the following properties: firstly, the physical storage of information is stable, i.e. information does not tend to disappear with passage of time; and, secondly, the operation of writing is capable of being made "atomic", i.e. once information has been presented for writing, one can be certain that the information is correctly written or else it is not written at all.

At present, stable memories are made from disks. Although disks do not directly provide stable data storage, they enable such stable storage to be obtained, in particular by conjoint use of two disk units. However, this method of proceeding has drawbacks. The first drawback is that the access time to a disk memory is not short enough for a stable storage unit based on disks to be considered as being a fast memory. The other drawback is that the stable character of the memory is obtained by copying the same information into both disk units. The controlling processor uses its own read/write memory to perform this double copying operation. As a result, if an error occurs in said processor between writing to one of the disks and writing to the other disk, the stable character of information storage is compromised.

SUMMARY OF THE INVENTION

The present invention solves these drawbacks, by providing firstly a memory (or data storage) device having fast access and capable of offering stable storage, and secondly by avoiding as much as possible any use of the processor's read/write memory for copying information into two different sections of memory.

The proposed data storage apparatus comprises, in combination:

a series of n banks of non-volatile memory which are externally addressable and which are provided with selective write or read controls; and key access means suitable for defining keys designating each of the memory banks and for subsequently responding to the insertion of one of the keys accompanied by a write or a read request by selectively authorizing writing or reading in a manner which is applicable to the single memory bank defined by the said key, said authorization being destroyed after any memory bank has been addressed or after any new key has been inserted, thereby enabling each of the n memory banks to be used independently and successively by different processes without any risk of uncontrolled access.

In an advantageous embodiment, the key access means comprise:

an access table having P n-bit cells, each cell being capable, as a function of its index k, of receiving or of delivering at the output from the table a byte having not more than one bit which is different from the others; and a series of n access entitlement registers respectively connected to the n outlets from the access table, said registers enabling one additional register designated by the different bit of the byte defined by the current index, each register possessing at least three states, including a rest or no access entitlement state, together with two access entitlement states for writing and reading respectively, which states can only be taken when the register is enabled.

With each memory bank being associated with a respective one of the registers in such a manner as to respond to external addressing only if a write or a read access entitlement has been noted in the associated register.

Preferably, the outlets from the access entitlement registers are applied to two multiplexers respectively for writing and for reading addresses in accordance with the number of the memory bank being addressed, write or read authorization being given to the memory banks by the outlet from the write multiplexer or from the read multiplexer, as the case may be.

The invention also provides a method of transferring data between a processor and a data storage device as defined above. The processor is deemed to be required to run a plurality of independent processes. The method comprises the following operations:

(a) on each request for new memory from a process, allocating to said process a free bank of memory of rank noted i, and seeking a key k associated with the rank 1 of the bank, then communicating to said process only the key k and the physical address of the bank; and (b) only performing a write or a read operation for said process when said operation is preceded by an access opening instruction including the key k attributed to the process and the nature (writing or reading) of the operation, which has the effect of authorizing physical access to a single designated bank for writing or reading, as the case may be.

It may happen that several processes have to share the same memory bank. In this case, in addition to the said key giving access to the information storage apparatus, the processor attributes respective encrypting keys to each of the sharing processes in their work spaces, each of which encrypting keys is associated with the address of the zone reserved for the process as encrypted by said key.

Very advantageously, each process is associated at the same time with a pair of zones belonging to two distinct memory banks: each write operation comprises writing into one of the zones whose register is in write access, while the register of the second zone is not in access, and then copying the first zone into the second zone with the first zone register being in read access and the second zone register being in write access, whereafter both registers return to the no access state: reading is performed in both zones, and it is essential that they both give the same result.

In order to obtain atomic writing, when an anomaly occurs while writing to the first zone, writing is stopped, and on being restarted the second zone is copied back into the first, such that the write operation does not take place; whereas if an anomaly occurs while the first zone is being copied into the second, writing is stopped, and on restarting the first zone is copied again into the second, such that the write operation is performed.

In some applications it is desirable for the processor to be associated in this manner to a memory unit having two stable type disks. In which case only data taken from the fast data storage apparatus is transferred into the disk memory unit.

BRIEF DESCRIPTION OF THE DRAWINGS

Other characteristics and advantages of the invention appear from the following detailed description and the accompanying drawings, in which.

DETAILED DESCRIPTION OF THE PREFERRED EMBODIMENTS

The drawings show objects of specific character. They are to be considered as being incorporated in the description to contribute to defining the invention.

In what follows, reference is made to various documents which are referenced as follows:

(BANA-82)—BANATRE M., LAPALME G. ENCHERE: A Distributed Auction Bidding System. 3rd Int. Conf. Distributed Computing System (Miami, October 82), pp. 833–837.

(GRAY-78)—GRAY J. N.
Notes on Database Operating Systems. LCNS 60, Springer-Verlag, (1978), pp. 393–481.

(GIFF-82)—GIFFORD D.K.
Information Storage in a Decentralized Computer System.
CSL-81-8, Xerox Palo Alto Research Center, March 1982.

(LAMP-76)—LAMPSON B. W., STURGIS H.
Crash Recovery in a Distributed Data Storage System.
Working Paper, Xerox PARC, November 1976.

The present invention is particularly applicable to a decentralized commercial transaction system using distributed computing means. Some of the aspects required by such a system have already been described (BANA-82).

In outline, the idea is to enable members of an organization which includes sellers and buyers to perform commercial exchanges, e.g. in the "Dutch clock" manner. In logic, the entity which models a commercial exchange is the transaction.

Generally speaking, transactions are deemed to possess three essential properties (GRAY-78):
(i) consistency or coherence: the transactions must obey legal protocols;
(ii) atomicity: a transaction either takes place or it does not take place; and
(iii) durability: once a transaction has been validated, it can no longer be cancelled.

Figure 3:
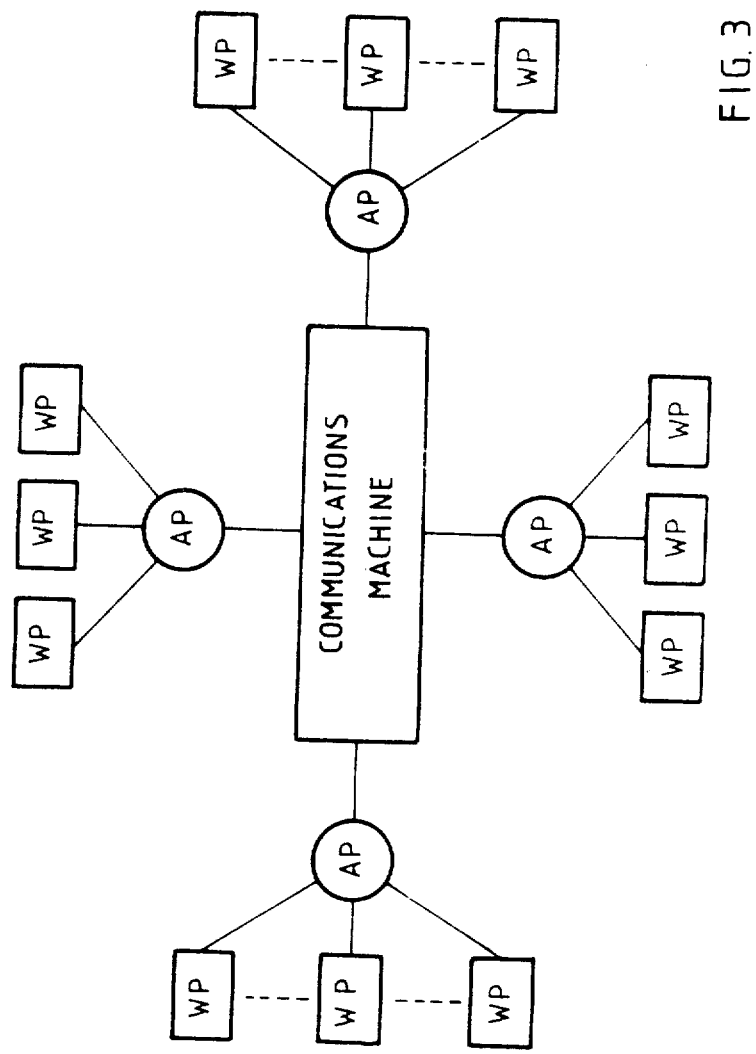
FIG. 3 illustrates a transaction system employing distributed computing with stable memories.

The basic structure of a transaction system is shown in FIG. 3. It comprises a series of application processors AP which process transactions. The users, buyers or sellers, may communicate with the system defined by said application processors via work positions (WP), whose purpose is to enable buyers and sellers to participate in transactions. All the application processors AP are connected via intercommunication means or a communications machine MC. This enables users to join and leave the system and also to communicate information thereto.

The physical embodiment of the communication machine (MC) may take various different forms, such as a local network or a plurality of local networks interconnected by means of a national network (e.g. Transpac).

The system hereinafter referred to as ENCHERE is made up of two levels, namely the machine level and the application level.

The machine level comprises sites Si each of which is arranged about an application processor AP, work positions WP and the communications machine MC.

When considering a particular work position (e.g. $WP_j$) belonging to a site $S_j$, i.e. connected to application processor $AP_j$, the workstation $WP_i$ sends orders to the site $S_j$ which interprets the orders. In said orders, a "new sale" causes a new transaction to be initiated. In order to perform this new transaction, several processes are created, one at the seller site, and the others at the buyer sites. One of the processes, the co-ordination process, represents the seller; the others, slave processes, represent the buyers who are going to participate in the sale. Such a group of processes co-operating for the purpose of performing a common task, in this case the sale of a product, is called an "activity". Naturally, several activities may take place at the same time.

Such a system constitutes an example of the case where two types of anomaly may occur:
  anomalies due, for example, to software which may lead to undesirable actions, in particular actions having the result of uncontrolled access to memory; and
  various types of hardware anomaly, of which the simplest is loss of electrical power, and which may also have the result of uncontrolled access to memory.

The invention solves the problems explained above by means of a particular stable memory, together with optional additional means.

A stable memory (LAMP-76) is an information medium which possesses two essential characteristics:
(i) a non-volatile physical medium; and
(ii) atomic read and write operations.

Generally, the physical medium used for constituting a stable memory is a disk. Although it does not intrinsically possess characteristic (ii), it may be programmed to possess said characteristic.

In the ENCHERE system, each application processor AP (FIG. 1) is equipped with a stable memory which contains:
  the activity process stable variables which are modified by performing interleaved atomic activities and which are destroyed when the creating process is terminated, e.g. the variable representing EA(V) at a seller site process, where EA(V) designates the set of buyers associated with a given seller for a given transaction; and
  objects (of the type "file") whose lifetime is greater than the atomic acitivity process which have access thereto and which modify them. A list of lots for sale constitutes an example of such an object.

Given that it is unrealistic to store stable variables on a disk, mainly because of the access time, the stable memory comprises two levels:

a stable fast access memory (MRS) constituted by means of a non-volatile read/write memory, for storing stable variables; and a disk unit (UD) which contains the objects.

The fast stable memory is the first essential contribution of the invention.

The fast stable memory (FIG. 1) is a part of the address space of the application processor AP.

The contents of the stable variables of a process running on a processor AP is vulnerable to unforeseeable behaviour of the processor resulting from a hardware fault (loss of power, . . . ) or from a software fault (violation of memory protection, . . . ). To cope therewith, the invention proposes a memory MRS provided with hardware and software protection mechanisms described below. Preferably, the processor AP also uses a disk memory unit UD, as indicated above.

Figure 2:
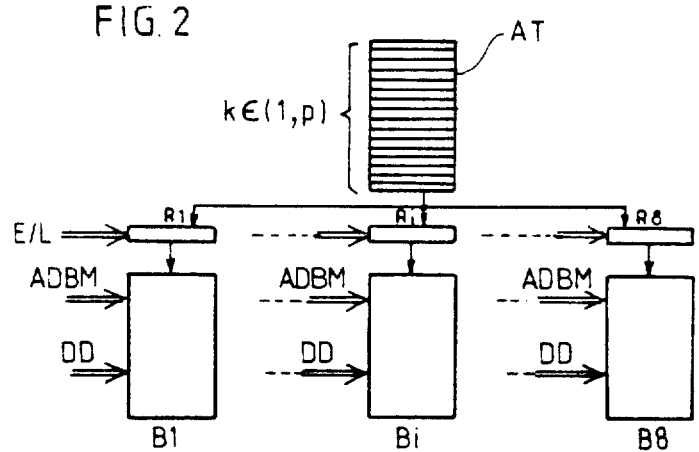
FIG. 2 diagrammatically illustrates the general structure of the fast stable memory.

The stable fast memory MRS is constituted by 8 memory banks. Read or write access to each of these banks is protected by a key. This is illustrated in FIG. 2.

In this figure:

Bi, i∈[1,8] represents a memory bank, with the size of such a bank being fixed at 8 K 8-bit bytes, for example;

Ri, i∈[1,8] is a 2-bit register associated with bank Bi, it contains current access entitlements for the bank. (00: no access, 01: read access only, 10: write access only, 11: read and write access); and AT is an access table with p=8-bit bytes. Bit j of byte k in this table is set to 1 if bank j of the memory is addressable. k constitutes the hardware key for access to bank j.

Elementary access to the stable fast memory MRS is described below:

a process P in processor AP which seeks to use a memory bank must initially acquire the bank by executing an "Allocation" primitive. The effect of this primitive in processor AP is as follows:

a free bank Bi, i∈[1,8] is allocated;

a free inlet k to the table AT is sought, and bit i of AT[k] is set to 1; and the data pair (adr,k) is delivered to P, where ADR is the physical address of the bank and k is the access key to said bank.

P may only copy the content of a register reg to address y in MRS by executing the following pair of instructions: open (k,E); write (reg,x), where x represents the address y followed by the word to be copied.

Execution of the operation open has the effect of changing the register Ri associated with the bank Bi (pointed to by AT[k]) with a "write" access entitlement.

Execution of the operation write (reg,x) only copies the contents of reg to address y in the stable fast memory MRS if y is the address of a byte in Bi; otherwise the operation is refused. After the operation has been executed, the bank Bi is no longer accessible and the contents of Ri is "no access".

Read processing is similar to write processing, and requires the pair of instructions: open (k,l); read (reg,x).

The operations of reading or writing in a zone of stable fast memory are now described.

The operations of reading or writing in a zone of stable fast memory MRS are performed on the basis of elementary read or write accesses, each of which is preceded by an open operation.

In the following description it is supposed that the bank is open for writing (or reading) if a write (or read) operation in the zone is taking place.

Hardware access protection mechanisms described above ensure firstly that no direct access may be performed to a memory bank, and secondly that all access thereto is heavily verified by means of access keys.

These mechanisms which are satisfactory provided a bank is accessed by one process only, are no longer satisfactory if a plurality of processes share the bank. Additional means are therefore provided to prevent one process accessing a bank from damaging a zone belonging to another process in the same bank.

The protection mechanism associated with bank sharing is now described: two processes P1 and P2 share a common bank of the stable fast memory (hereinafter referenced MRS).

The invention provides a software mechanism which detects illegal access by P1 to the data zone belonging to P2, and vice versa. The solution proposed uses encryption (GIFF-82).

The processor system AP delivers to each process (which reserves a zone in the memory MRS) a pair of data items comprising an encrypting key and the zone address encrypted using said key.

Any subsequent access to said zone can only be performed by a process which possesses said pair of data items. Any attempt at decrypting that leads to failure causes a fault which is detected by the system.

All accesses defined so far have concerned only writing and reading in a zone of a bank in the MRS. There now follows a description of atomic read and write operations on the stable fast memory PRS.

The system allocates to each process P running on the application processor a pair of zones (Zi, Zj) belonging to two distinct banks Bi, Bj, such that a stable variable used by P is always represented by two copies in two independent banks.

A—Atomic writing of a stable variable V from P into MRS.

Let Vi and Vj be the addresses at which V is copied in banks Bi and Bj, then writing is described by the following algorithm:

1—Bi open for writing—no access to Bj;
2—write V into Vi;
3—Bi open for reading—Bj open for writing;
4—write Vi into Vj; and
5—no access to Bi—no access to Bj.

This algorithm ensures that at the end of step 5 both copies Bi and Bj of V in MRS are identical. This would not be the case if the write operation consisted in writing V into Vi and then writing V into Vj, since the copy of V in memory could be modified due to anomaly occurring between the two write operations (steps 2 and 4).

Supposing that an anomaly occurs during step 2, in this case V is not written into Vi. The recovery mechanism implemented by the system ensures that the bank Bj is copied back into the bank Bi on restarting. The atomic writing of V into MRS has not taken place.

Supposing that an anomaly takes place in step 4, the copy of Vi to Vj does not take place. On restarting, Vi is recopied into Vj and Vi is thus effectively written into Vj. Atomic writing of V into MRS has been performed.

It should be observed that: proper operation of the above algorithm supposes that the passage from the state (Bi write open—Bj read open) to the state (Bi read open—Bj write open) is indivisible. Otherwise, on restarting after an anomaly, the bank Bj (or Bi as the case may be) which is write open is considered as being inconsistent and cannot be used for reinitializing the other bank Bi (or Bj as the case may be).

B—Atomic reading of a variable V in MRS.

Reading is described by the following algorithm:
1—Bi open for reading—Bj open for reading;
2—if co the contents of Vi and Vj are equal co (where the symbols co delimit a comment which relates to a series of test operations that are easily performed).
Then:
co Vi is copied into V (into read/write memory) co else
co fatal error, an abnormal modification of Vi or of Vj has not been detected co endif.
3—Bi no access —Bj no access.

If an anomaly occurs during phase 2, the operation is restarted at phase 1.

Figure 1:
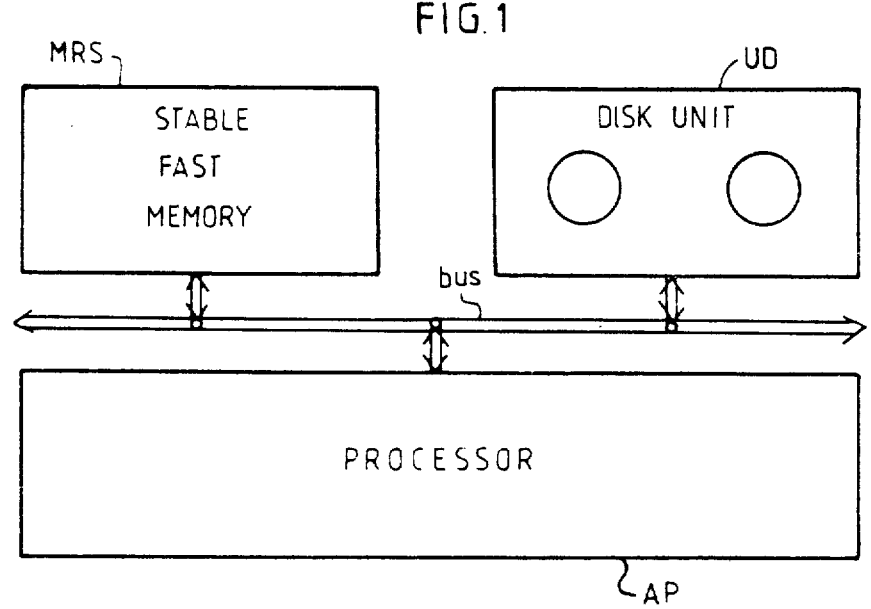
FIG. 1 diagrammatically illustrates a processor associated with a fast stable memory and with a disk unit.

Reference is now made to operating the disk unit (UD) which preferably accompanies the stable memory MRS (FIG. 1).

The only objects to be transferred from the address space of the processor AP to the disk unit UD belong to the memory MRS. The algorithms used for reading or writing an object in or to the UD are similar to those described in (LAMP-76).

The fact that only objects situated in MRS may be written to UD ensures that the two copies OD1 and ODA of an object O in UD are identical (providing writing takes place properly). This is because objects O in MRS are protected against uncontrolled access. This is not the case in (LAMP-76) where the object copied to disk is in read/write memory and is thus capable of being modified between two write operations to the disk.

In conclusion, it appears that the stable fast memory proposed herein has the following important advantages:

performance: access time to information stored in MRS is very fast, and is only twice as long as access time to information of the same size stored in read/write memory. This access time is much shorter than the access time generally obtained for stable memories based on a disk. By way of comparison, the time taken to write 256 8-bit bytes using an I 8086 processor into the MRS is 0.5 ms, as compared with 9 ms for a disk system DFS in conjunction with Altos processors;

security: the MRS is protected against any attempt at erroneous access while being updated; and atomicity: both in writing and in reading, atomicity is provided by the means described above.

Figure 4:
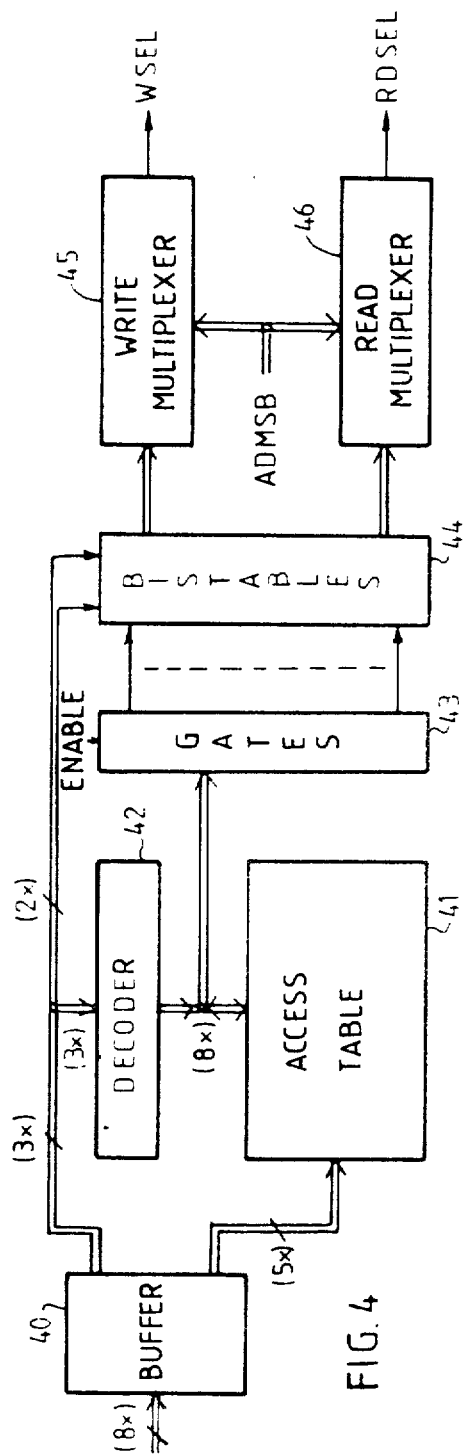
FIGS. 4 and 5 illustrate in more detail one embodiment of a stable fast memory.
Figure 5:
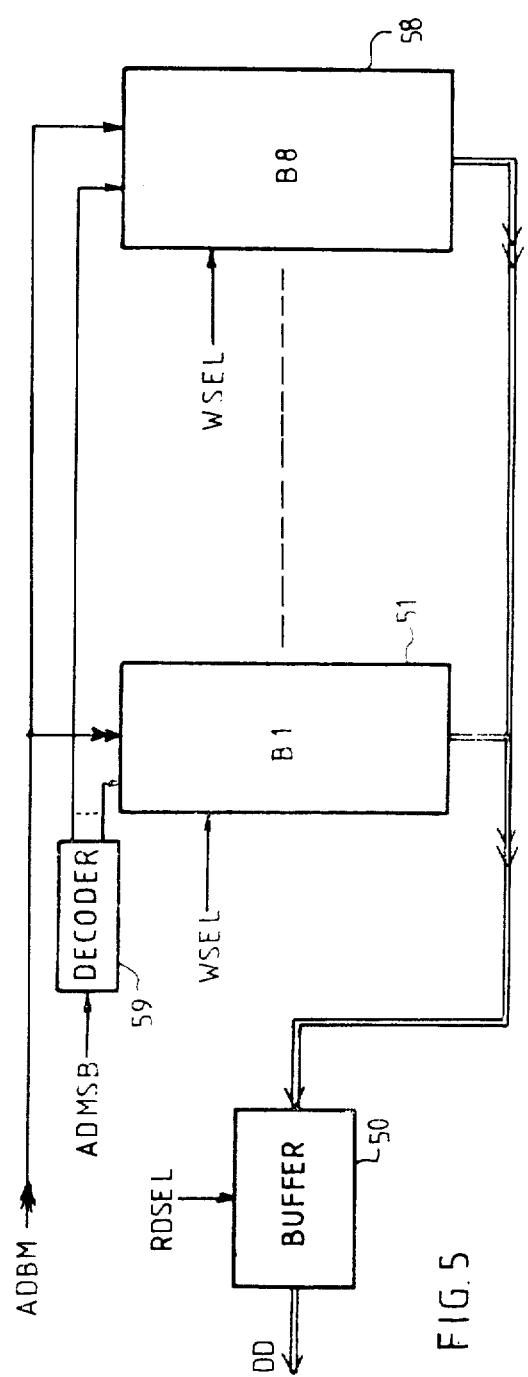

There follows a description of one particular embodiment of a fast stable memory given with reference to FIGS. 4 and 5.

Inlets constituting primitive "allocate" or "open" instructions, as the case may be, are applied in the form of eight wires to an inlet buffer 40. Five outlet wires from the inlet buffer 40 are used for addressing the access table 41.

The other three outlet wires from the buffer 40 are applied initially to a decoder 42. The decoder 42 is a 3 to 8 decoder and thus has eight outlets which serve as data inlets to the access table 41. Thus, the allocation instruction serves both to define the index k by the addresses to the access table 41, and to load a key via the decoder 42. In the key only one bit is set to 1 and the rank i of that bit corresponds to the free bank Bi attributed to the process in question.

The eight inlets/outlets of the access table 41 are also applied to respective gates 43 which, together with n pairs of bistables 44 constitute the above-mentioned registers Ri.

For an "open" instruction, the key K is communicated as an address to the access table 41 as before. Instead of being applied to the decoder 42, two of the three other wires from the buffer 40 are applied to the bistables 44, with each wire being connected to a respective one of the two bistables in each pair. In responce to the address information applied thereto, the access table delivers a 1 bit on a single one of its eight outlets. The gates 43 then enable only one of the pairs of bistables 44, and only that pair can receive the write or read order as transmitted over the two lines going from the buffer 40 to the bistables 44. The primitive open instruction is thus recorded in the bistables 44.

The outlets from the bistables 44 are grouped together with one of the groups concerning the write bistables and the other the read bistables. The group of lines relating to the write bistables is applied to a write multiplexer 45. The group of lines leaving the read bistables is applied to a read multiplexer 46. Both multiplexers receive the more significant bits of the memory bank addresses (i.e. the bits representative of the bank numbers), with said more significant bits being conveyed by lines referenced ADMSB. Finally, the write and read multiplexers 45 and 46 respectively supply the write and read authorization signals respectively referenced WSEL and RDSEL.

In FIG. 5, a buffer marked 50 receives the read signal RDSEL. The memory banks B1 to B8 are designated by numerical references 51 to 58. The address lines common to all of the banks marked ADBM are applied to the memory banks 51 to 58. The above-mentioned signal ADMSB is applied to a decoder 59 which activates only one of the banks B1 to B8. Each of these banks additionally receives a write authorization WSEL (if one exists). Finally, the data outlets from the banks 51 to 58 are applied in common to the buffer 50. The buffer 50 may deliver said data as a data outlet signal DD under the control of the read authorization signal RDSEL.

It can now be seen that a write or read order concerning one of the memory banks is only performed if the address contained in said order corresponds to the address as defined by the preceding open order, as stored in the bistables 44 and as applied to the various memory banks via the multiplexers 45 and 46.

There follows a description of an advantageous example of a "commit" protocol, which highlights the usefulness of stable memories. It is recalled that a single activity requires a co-ordinating process associated with a seller to act in conjunction with slave processes associated with buyers.

Generally speaking, the slaves send a "ready to commit" message to the co-ordinator. Once all of the slaves have sent this message, the co-ordinator can take a commit decision.

Figure 6:
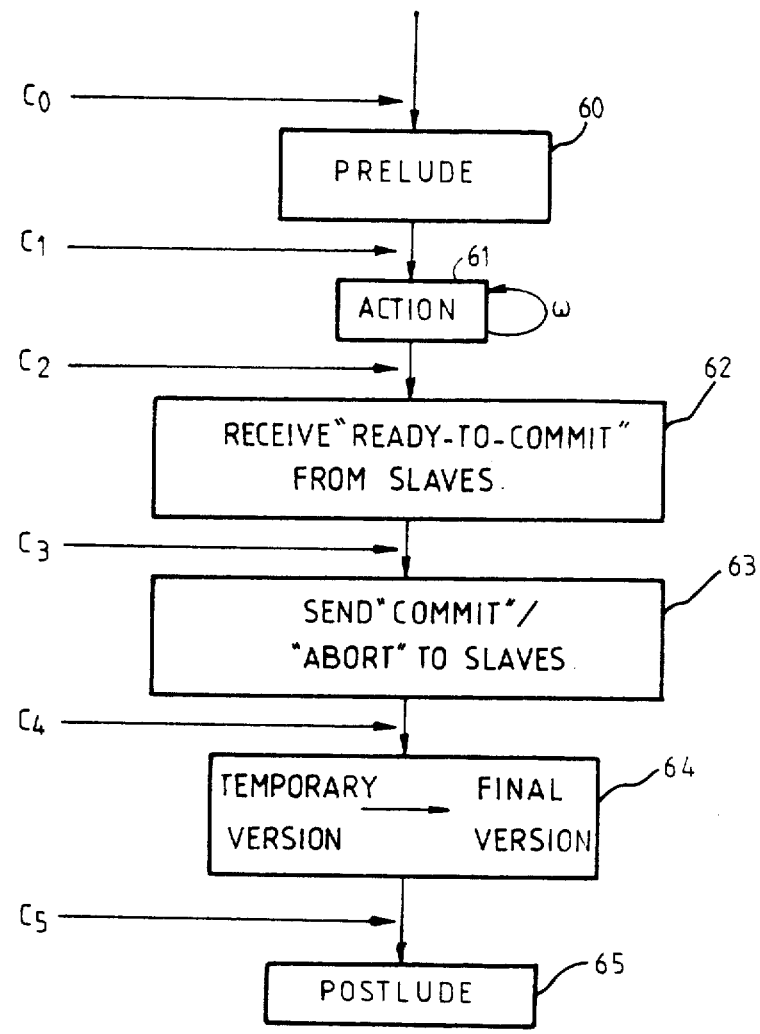
FIGS. 6 and 7 are two flowcharts applicable, in particular, to the transaction system of FIG. 3.

If one (or more) slave makes a request to abort the activity, the co-ordinator proceeds to abort said activity. The flowchart of the co-ordinating process is shown in FIG. 6.

A prelude, at step 60, is concerned with allocation of resources, and in particular with the allocation of channels. The "action" step 61 analyzes the orders coming from other processes. A specific sequence of instructions is performed as a function of these orders. Then, at step 62, the co-ordinator receives "ready to commit" messages from the slaves. When it has received all of these "ready to commit" messages, the co-ordinator may decide (step 63) to proceed with commiting (by sending "commit" messages) and then with commiting its own objects. If at least one of the slaves has had difficulties (was not able to send the "ready to commit" message), the co-ordinator sends an "abort" message to all of the slaves and erases its own temporary version (step 64). Otherwise, the temporary version becomes final at step 64.

The allocated resources are released during a "postlude" step 65.

Figure 7:
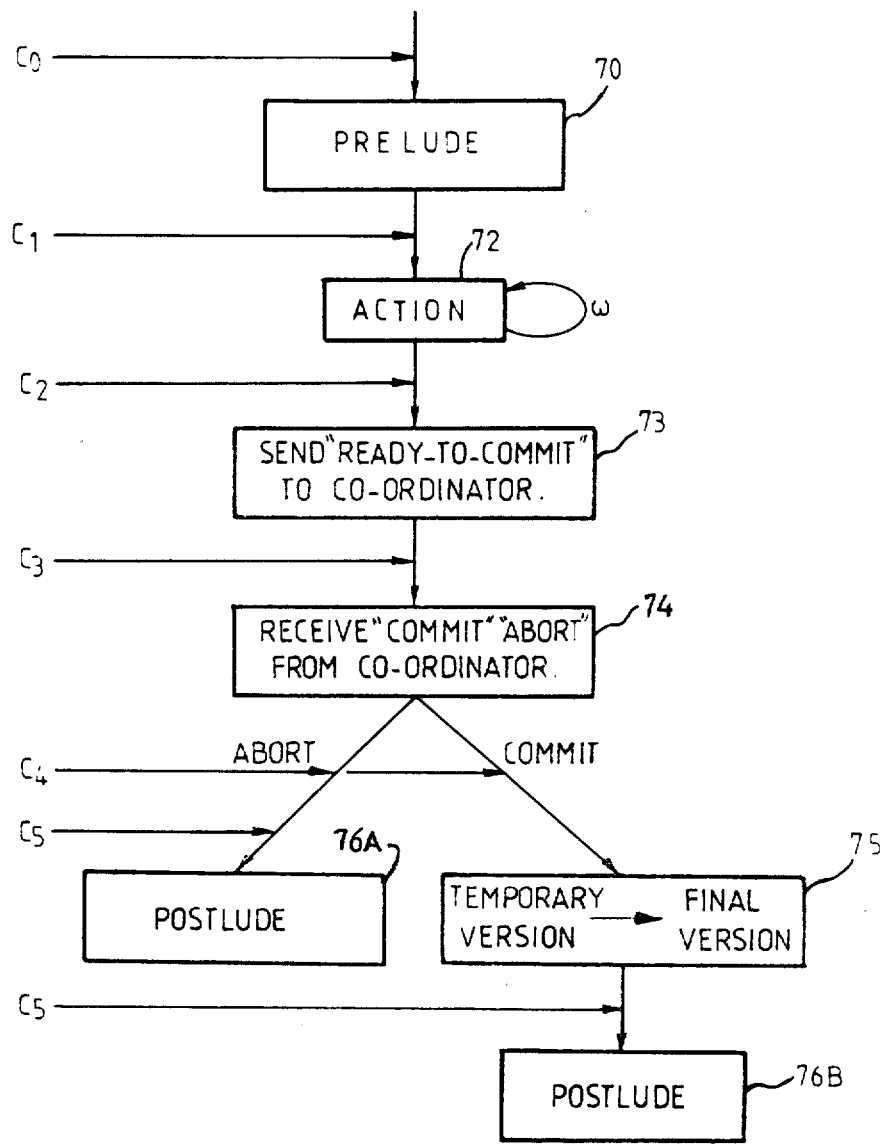

Arrows $C_i$ designated checkpoints where the status of the process is saved. If an anomaly occurs between $C_i$ and $C_{i+1}$, the process is restarted at point $C_i$. Once The postlude has been started, it must be finished even if several attempts are necessary (the postlude is *idempotent*). FIG. 7 is a flowchart of a slave process. Steps 70 to 76A or 76B can be understood from the flowchart of the co-ordinating process. The existence of the same process-saving points $C_i$ (with I going from 0 to 5) and the existence of a switch depending on whether a process is committed or aborted should be observed.

Behaviour in the event of an anomaly is interesting. The co-ordinating process has the role of:
detecting bad slave operation (as seen from a suitable distance); and
committing or aborting activities.

An anomaly may occur before or after an activity has been committed.

If an anomaly occurs before an activity is committed, the system starts from the image of the process as saved in stable memory and performs the following actions:
the prelude of the co-ordinating process is re-performed, thereby re-allocating the required resources (channels, etc.) to enable the processes to interact;
local variables are reinitialized from information stored in stable memory; and
the co-ordinating process is restarted from point $C_i$, which is the last checkpoint performed by the co-ordinating process prior to the anomaly.

The co-ordinating process may suffer from an anomaly after taking the decision to commit activities. If the anomaly occurs while the co-ordinating process is sending activity-committing signals to the slaves, the system performs the following actions:
the co-ordinating process prelude is executed; and
the system restarts from checkpoint $C_5$.

If an anomaly occurs prior to an activity being committed, the reaction of each slave process is similar to that of the co-ordinating process described above.

If an anomaly occurs after the pre-committing message has been sent, the slave process in question re-executes its own prelude and then waits for a committing signal from the co-ordinating process.

It may be observed that the slave processes may either receive "abort" messages from the co-ordinating process, or else they may commit "suicide".

This brief description of the ENCHERE system shows the advantage of stable memories, together with their role in the protocols required for committing activities.

What is claimed is:

1. A data storage apparatus comprising:
banks of externally addressable non-volatile memory, which are provided with selective write/read controls, and which are capable of forming a part of an address space of a processor; and
access authorization means connected with said memory banks and suitable for selectively designating a memory zone constituted by at least a portion of one of the banks for a write operation or a read operation in response to an access authorization request, said write or read operation being constituted by an indivisible transfer of a group of elementary data items, said access authorization request being exclusive and destroyed after said memory zone has been addressed.

2. Apparatus according to claim 1, wherein the memory banks, or distinct memory bank zones, are coupled in pairs relative to the access authorization means, and the access authorization means possess three different states associated with each pair of memory zones:
(a) write to first zone, second zone inaccessible;
(b) read first zone, write to second zone; and
(c) read both zones.

3. Apparatus according to claim 2, wherein the access authorizing means, during a complete and valid write operation necessarily pass through at least the first two states of the said three states in order without repeating any of them to write data from the processor firstly into a first zone of a first bank, and then to recopy the data from the first zone of the first bank into a second zone of a second bank which is coupled to said first zone.

4. Apparatus according to claim 3, wherein the access authorization means are disposed to decompose operations of reading and writing into elementary read and write phases for an elementary group of data items in the memory zones, each of which phases is uninterruptable.

5. Apparatus according to claim 1, wherein the access authorization means include locking means.

6. Apparatus according to claim 1, wherein the access authorization means comprise, for each memory bank, auxiliary memory members disposed to selectively control access to all or to a portion of an associated memory bank.

7. Apparatus according to claim 1, wherein the access authorization means comprise:
key access means suitable for defining keys, each of which designates a zone in one of the memory banks, and for subsequently responding to an insertion of one of the keys accompanied by a read request or by a write request by authorizing writing or reading selectively in a manner which is applicable to a single memory zone and a single memory bank defined by one of the keys, said authorization being destroyed after any addressing in said memory zone or by an insertion of a new key.

8. Apparatus according to claim 7, wherein the key access means comprise:
a key generator; and
access entitlement registers capable of being selectively enabled by one of the keys, each register possessing at least three states including a rest or no access entitlement state, together with two access entitlement states for writing and reading respectively, which state can only be occupied when the register is enabled; and
each memory zone being controlled for access thereto by a respective one of the registers in such a manner as to respond to external addressing only if an access entitlement for writing or reading has been marked in the register which is associated therewith for its control.

9. A method of transferring data between a processor and a data storage apparatus, said method comprising the steps of:
   a. accessing said data storage apparatus via access authorization means connected with memory banks of said data storage apparatus;
   b. designating a memory zone, constituted by at least a portion of one of said memory banks, selectively for a write operation or a read operation in response to an authorization request, said write and read operations being constituted by an indivisible transfer of a group of elementary data items; and
   c. eliminating said authorization request after said memory zone has been addressed or in response to a subsequent authorization request.

10. A method as claimed in claim 9, wherein said processor is suitable for performing a plurality of independent processes, each process being simultaneously associated with first and second memory zones belonging to first and second distinct memory banks, respectively, further comprising the steps of:
   a. writing data to said first memory zone while said first memory zone is in a write access mode and said second memory zone is in a no access mode;
   b. copying the data written to the first memory zone into said second memory zone while said first memory zone is in a read access mode and said second memory zone is in a write access mode; and
   c. setting said first and second memory zones into a no access mode.

11. A method as claimed in claim 10, further comprising the steps of:
   a. stopping said writing of data to the first memory zone when an anomaly occurs during said writing of data; and
   b. copying the data from said second memory zone into said first memory zone when a restart operation is initiated.

12. A method as claimed in claim 10, further comprising the steps of:
   a. stopping said copying of the data written to said first memory zone into said second memory zone when an anomaly occurs during said copying of data; and
   b. recopying data from said first memory zone into said second memory zone when a restart operation is initiated.

13. A method as claimed in claim 10, further comprising the steps of:
   a. allocating a free memory zone to each new memory request from said processor;
   b. generating a key associated with said free memory zone; and
   c. communicating said key and a physical address of said free memory zone to said processor;
   whereby a write or a read operation performed by said processor to said free memory zone is prevented unless said write or read operation is preceded by an access opening instruction comprising said key associated with said free memory zone.

14. A computer system comprising:
   a. a plurality of processors interconnected by a common intercommunication medium, said processors being capable of performing one or more independent processes; and
   b. stable memory means connected with each of said processors, said stable memory means comprising a plurality of externally addressable memory banks having selective write/read controls, and access authorization means, connected with said memory banks, for selectively designating a memory zone constituted by at least a portion of one of the memory banks for a write or read operation in response to an access authorization request.

15. A computer system as claimed in claim 14, wherein one of said plurality of processors is a co-ordinator processor and the remaining processors are slave processors.

16. A computer system as claimed in claim 15, wherein said co-ordinator processor performs a prelude, an action, a wait for reception of a "ready to commit" message from each of said slave processors, sends a commit or an abort message to said slave processors, a transformation of a temporary version of information into a final version thereof or deletion thereof in the event of an abort, and a postlude, while each of said slave processors performs a prelude, an action, sends a "ready to commit" message to said co-ordinator processor, receives a commit or an abort message from said co-ordinator processor, followed by a postlude, which is preceded by transforming said temporary version of information into a final version of information when a commit message is received.

17. A computer system as claimed in claim 16, wherein said co-ordinator processor and said slave processors save information in said stable memory means between a repeated transformation operation performed in said postlude.

* * * * *